(12) United States Patent
Trouve et al.

(10) Patent No.: US 10,611,652 B2
(45) Date of Patent: Apr. 7, 2020

(54) DEVICE AND METHOD FOR RECOVERING A PRECIPITATED SOLID INORGANIC FINAL PRODUCT CONSISTING OF PHOSPHORUS, NITROGEN AND AN ELEMENT X

(71) Applicant: Emmanuel Trouve, Vacquières (FR)

(72) Inventors: Emmanuel Trouve, Vacquières (FR); Guilhem Molles, Montpellier (FR)

( * ) Notice: Subject to any disclaimer, the term of this patent is extended or adjusted under 35 U.S.C. 154(b) by 182 days.

(21) Appl. No.: 15/516,468

(22) PCT Filed: Oct. 2, 2015

(86) PCT No.: PCT/EP2015/072809
§ 371 (c)(1),
(2) Date: Apr. 3, 2017

(87) PCT Pub. No.: WO2016/055372
PCT Pub. Date: Apr. 14, 2016

(65) Prior Publication Data
US 2018/0237319 A1   Aug. 23, 2018

(30) Foreign Application Priority Data
Oct. 6, 2014 (LU) .......................................... 92566

(51) Int. Cl.
*C02F 1/52* (2006.01)
*B01D 9/00* (2006.01)
*C02F 101/10* (2006.01)
*C02F 101/16* (2006.01)
*C02F 1/20* (2006.01)
*C02F 1/66* (2006.01)

(52) U.S. Cl.
CPC .......... *C02F 1/5236* (2013.01); *B01D 9/0036* (2013.01); *B01D 2257/40* (2013.01); *B01D 2257/55* (2013.01); *B01D 2257/60* (2013.01); *C02F 1/20* (2013.01); *C02F 1/66* (2013.01); *C02F 2001/5218* (2013.01); *C02F 2101/105* (2013.01); *C02F 2101/16* (2013.01)

(58) Field of Classification Search
CPC .................................................... C02F 1/5236
See application file for complete search history.

(56) References Cited

U.S. PATENT DOCUMENTS

2010/0314327 A1* 12/2010 Lean ...................... B01D 21/01
210/738

* cited by examiner

*Primary Examiner* — Peter Keyworth
(74) *Attorney, Agent, or Firm* — Steven M. Shape; Dennemeyer & Associates, LLC (57) ABSTRACT

The present invention relates to a device and a method for recovering a large and dry precipitated solid inorganic final product (3D), consisting of phosphorus, nitrogen and an element X selected from the alkaline-earth metals, from a first fluid (1) consisting of at least one divalent cation X2+ mixed with a second fluid (2) containing phosphorus and nitrogen, said device including at least one first reactor (19) which is intended for a primary crystallization reaction, has any shape, and is connected to a second spiral-shaped reactor (20) for secondary crystallization/deposition.

14 Claims, 9 Drawing Sheets

DEVICE AND METHOD FOR RECOVERING A PRECIPITATED SOLID INORGANIC FINAL PRODUCT CONSISTING OF PHOSPHORUS, NITROGEN AND AN ELEMENT X

The present invention relates to a device for recovering a large and dry precipitated solid inorganic final product consisting of phosphorus, nitrogen and an element X.

The field of application is the recovery of phosphorus from fluids stemming from any type of anaerobic or anoxic processes such as fermentation, digestion, methanization, biodegradation, denitrification and treatment of waste waters.

The methods for recovering phosphorus, notably in the form of MAP (magnesium, ammonium, phosphate) are being developed for the last thirty years. The physicochemical route (crystallization, precipitation) is imposed as being the most efficient and reliable, but its development today abuts on its non-cost effectiveness when the phosphorus deposit (waste water, juices and fermentation musts) does not exceed 150-200 kg phosphorus/day. The majority of phosphorus deposits do not exceed this flow and in spite of many recent developments, the proposed technologies based on the principle of column reactors with a fluidized bed, do not give the possibility of attaining an economical yield for units of medium and small size. For example, there does not exist any cost-effective device for recovering phosphorus from waste waters from a city of 100,000 inhabitants. The main external factors bearing on the yield of the present systems for recovering phosphorus are the competition of low costs of mined phosphates on the one hand and the uncertainty as to the "peak of the phosphate resources" on the other hand (University Studies of Dana Cordell, estimation of the date of the peak varying from 2030 to 2400): without any technological break, an increase in the economical viability of the recovery of the phosphorus cannot be expected in the close future.

The main intrinsic non-cost-effectiveness factors of the present devices for recovering phosphorus are on the one hand their large dimension (reactors of a great height) which generates heavy investments (hangars, civil engineering, large pieces of equipment), and on the other hand the not very intensive nature of the methods applied (the dwelling times are limited, therefore the precipitated particles only have a reduced size, and the required consumption of reagents is high).

From the state of the art, are known:

RIM NUT—an ion exchange technique (Italy): in order to extract phosphorus from methanized urban fluids, the principle for extracting MAPs (magnesium, ammonium, phosphate) is based on an exchange of ions prior to addition of NaCl, $HPO_4$, MgCl and NaOH. The complexification of the method would give the possibility of improving the yields and of reducing the dimensions. However, the unit has never been marketed for industrialists.

Phosphorus Recovery—Fraunhofer (Germany): the Fraunhofer process is based on the electrolytic exchange via electrodes immersed in the solution. The unit is containerisable and adapted to small flows. At the present time, the unit is in a test phase and is not marketed.

EP 2511243 (NURESYS) relates to a method for recovering phosphorus from waste water by improving the precipitation reaction by preliminary sowing with hydrated calcium silicate particles.

Rem Nut Ion Exchange Plus Struvite Precipitation Process, Lorenzo Liberti, department of Civil and Environmental Engineering, Polytechnic University of Bari, discloses a method allowing simultaneous removal of phosphate ions and of ammonium ions.

US 20120261338 A1 relates to a method for treating waste water by precipitation of struvite.

US 2013/0220919 A1 discloses a method for recovering phosphate salts from a liquid in a reactor.

WO 2012134255 A1 describes a method and an apparatus for removing phosphorus and/or removing ammonium from liquid effluents from units for producing fertilizers by recovering phosphate crystals.

Diverse solutions were contemplated in the past:

Certain manufacturers have set into place a recirculation of the non-consumed magnesium in order to reduce the costs of reagents, with a slight reduction in the size of the reactor (about 10%). The investment cost is not improved, the over cost of the device for recycling the reagent is not compensated by the slight reduction in the size of the reactor.

RIM NUT technology, based on the ion exchange by zeolith, does not avoid the use of magnesium and the expected improvement in the bulkiness and therefore in the investment cost has not been confirmed at a full scale, because of the addition of the device for exchanging ions prior to the extraction step.

The Ostara corporation sows its reactor with fine particles of struvite in order to accelerate the formation of struvite grains of a larger size.

The Fraunhofer research center attempts, on the scale of the laboratory, an electrolytic approach for having the ions migrate to a specific area for forming struvite; the consequences in terms of bulkiness and of investment cost cannot yet be estimated with reasonable accuracy.

None of these devices gave the possibility of attaining economical cost-effectiveness for small and medium capacities.

SUMMARY OF THE INVENTION

The disclosure includes a device for recovering a precipitated solid inorganic final product which consists of phosphorus, nitrogen and an element X and a method for recovering a precipitated solid inorganic final product consisting of phosphorus, nitrogen and an element X.

Known prior art includes WO 2012134255 describing a device and a method for dephosphoration and/or removal of ammonium from raw liquid fluids from installations for producing fertilizers by precipitation of phosphorus, nitrogen and magnesium in the form of a crystal with added value. This device has a process for injecting fluids through the bottom of the reactor.

The difference between the closest prior art and the present invention corresponds to the combination of the characteristics mentioned in the independent claims.

The technical effect brought by this difference is to provide an improved yield of crystals of the final product by means of improved size because of a longer dwelling time in the reactors, but also to provide an improved rate for decantation/precipitation of the crystals of the final product, with moderate consumption of reagents. Indeed, WO 2012/134255 (cf. page 8) teaches us that the size of the crystals of the final product is 1.25 mm+/−0.25 mm while the size of the crystals of the final product of the present invention is comprised between 1 mm and 10 mm.

The objective problem to be solved by the present invention is to find an alternative device capable of providing an improved yield while maintaining the device at a reasonable dimension (height: 2 to 3 meters) and having an optimum shape for recovering a precipitated solid inorganic final product consisting of phosphorus, nitrogen and an element X having an improved size.

No device of the prior art proposes a second secondary crystallization-decantation reactor with a spiraled shape directly connected to a first primary reaction-crystallization reactor, said second reactor having:

a tilt angle of the turns comprised between 10° and 70° relatively to a substantially perpendicular axis (+/− 10%) to the vertical axis passing through the center of the diameter formed by the turns of the conduits of said at least one spiraled reactor and, an ascent rate in the reactor of the first fluid mixed with the second fluid comprised between 0.01 m/s and 3 m/s.

The solution proposed by the present invention is the use of a second spiraled reactor for secondary crystallization-decantation connected to the first reactor, giving the possibility of increasing the size of the crystals of the final product, of strongly increasing the decantation rate, of reducing the amounts of required reagents, and of increasing the volume of the reactor while reducing the overall volume of the unit. The dimensions of the device of the present invention are reduced by about 30% to 70% relatively to known devices.

One skilled in the art would not have had any serious incitement from the prior art in order to attain the device and the method of the present invention since WO 2012/134255 does not teach the use of a second spiral-shaped reactor for secondary crystallization—decantation connected to a first reactor but on the other hand WO 2012/134255 (cf. page 8) teaches us that the size of the crystals of the final product is 1.25 mm+/−0.25 mm while the size of the crystals of the final product of the present invention is comprised between 1 mm and 10 mm, preferably between 5 mm and 6 mm which actually proves that the present invention uses novel and inventive technical means.

The reaction of the present invention occurring in the first reactor (19) for primary reaction-crystallization and in the second spiraled reactor (20) for secondary crystallization—decantation may be described as follows:

$NH_4^+PO_4^{3-}Y$ being the first fluid (1), i.e. a phosphorus and nitrogen-containing fluid stemming from any type of anaerobic or anoxic process, $X^{2+}$ being the second fluid (2) selected from among $Be^{2+}$, $Mg^{2+}$, $Ca^{2+}$, $Sr^{2+}$, $Ba^{2+}$, $Ra^{2+}$, $Cd^{2+}$, $Cr^{2+}$, $Co^{2+}$, $Cu^{2+}$, $Eu^{2+}$, $Ge^{2+}$, $Fe^{2+}$, $Pb^{2+}$, $Mn^{2+}$, $Ni^{2+}$, $Pt^{2+}$, $Sn^{2+}$, $V^{2+}$, $Zn^{2+}$, $Ti^{2+}$, $Si^{2+}$, $Po^{2+}$, $Hg^{2+}$, $Yb^{2+}$, $Sm^{2+}$, $Md^{2+}$, $No^{2+}$.

$NH_4PO_4X$ being the precipitated solid inorganic final product (3) consisting of phosphorus, nitrogen and an element X, (traces of organic substances may subsist) nevertheless $NH_4PO_4X$ has a purity of 80%, 90%, 95%, 96%, 97%, 98%, 99%, 99.5%, or even 99.9%.

Y being the secondary remnant (6B) poor in phosphorus-nitrogen i.e. any chemical substance other than $NH_4PO_4X$, stemming from any type of anaerobic or anoxic process having to be discharged. Y may comprise organic and inorganic substances.

The invention appears in the form of a module with a compact geometry which is associated with a water extraction unit. The temperatures raised beforehand for the water extraction unit give the possibility of operating with the benefits of a hot fluid, and the recovery of an already discharged gas volume gives the possibility of increasing the pH of the fluid by the stripping effect of $CO_2$.

The originality of the present invention is that it combines both:

an extraction of MAP (Magnesium Ammonium Phosphate) at a high temperature (greater than or equal to 20° C., or 50° C., or 70° C. up to 90° C.), stemming from heat recovery. The temperature modifies the physical characteristics of water (viscosity) and improves the precipitation and crystallization conditions of the MAPs.

abandoning geometries of vertical linear reactors for a use of spiraled and multi-spiral decanters. The spiraled decantation module provides considerable decantation volumes with reduced occupation of the space. The spiraled shape of the decanter allows natural segregation of the large particles towards the bottom of the module and the air of the blower retains the fine suspended particles which will allow sowing of the fluid. The dwelling time is increased by the use of a second spiraled rector (20) connected to the first reactor (19).

a recovered gas flow on a unit for extracting waters from the methanization substrate is re-injected into the low portion of the spiraled decanter.

The fluid to be treated which is relevant in the present invention is a fluid stemming from:

methanization of a substrate, ideally a vegetable substrate, for which the dwelling time may vary from 5 to 50 days, ideally from 30 to 35 days, more ideally from 15 to 20 days, clarification by a pre-filtration system, the cut-off threshold of which is located between 50 and 1,000 µm, ideally from 200 to 300 µm, more ideally from 150 to 250 µm (clarified), the retained portion of a nano-filtration by membrane of this same juice (Phosphorus, Magnesium and Nitrogen concentrate), heat exchange with the hot water network of the methanization site rising the temperature of the fluid from 20° C. to 90° C., ideally 70° C.

The dimensions of the unit are reduced by 30% to 70% relatively to known units. The device of the present invention does not require any civil engineering work, and may be transported in a laid position in a container of 20 feet.

The present invention is accompanied by the following figures:

FIG. 9: in order to ensure proper dosage of the reagents, and therefore maximalization of the economical cost-effectiveness of the laboratory or site tests have to be carried out.

These tests (here as a Jar-test) give the possibility of defining the optimum amount of soda (NaOH) and of magnesium (MgCl or MgO) which has to be added.

The present invention relates to a device for recovering a large and dry (3D) precipitated solid inorganic final product consisting of phosphorus, nitrogen and of an element X selected from among earth-alkaline metals Be, Mg, Ca, Sr, Ba, Ra formed from a first phosphorus- and nitrogen-containing fluid (1) mixed with a second fluid (2) consisting of at least one divalent cation $X^{2+}$ selected from among $Be^{2+}$, $Mg^{2+}$, $Ca^{2+}$, $Sr^{2+}$, $Ba^{2+}$, $Ra^{2+}$, said device comprises the following means:
- at least one first reactor (19) for primary reaction-crystallization,
- at least one apparatus (5) for separating particles and discharging the secondary remnant (6B),
- at least one apparatus for adjusting the pH (40B),
- at least one apparatus for injecting (30) a gas (18),
- at least one apparatus (15) for providing the first fluid (1),
- at least one apparatus (16) for providing the second fluid (2), characterized in that said device comprises at least one second reactor (20) for secondary crystallization—decantation having a spiraled geometrical shape, said second reactor (20) being directly connected to said first reactor (19) through at least one valve (51) allowing the reaction bed of the first reactor (19), containing a small (3A) and intermediate (3B) solid inorganic product gradually becoming bigger, to be transferred into the reactor (20) for performing therein secondary crystallization before precipitating in order to obtain a wet and large precipitated solid inorganic final product (3C).

The device according to present invention has at least one initiation channel (17) containing said small (3A) and intermediate (3B) solid inorganic product, connecting said apparatus (5) for separating particles and discharging the secondary remnant (6B) to at least a conduit (15A) for injecting the first fluid (1) into the first reactor (19) for initiating the filling volume of said small (3A) and intermediate (3B) solid inorganic product in the first reactor (19) and in the second reactor (20) in order to obtain a wet and large precipitated solid inorganic final product (3C).

The device according to the present invention has at least one conduit (52) for suction of the gas upper volume of the apparatus (5) connecting the apparatus (5) to said apparatus (30) for injecting a gas (18) in order to promote recovery of said small solid inorganic product (3A).

The device according to the present invention comprises a second reactor (20) including at least a reaction conduit (7A, 7B, 7C, 7D) forming a plurality of turns (4) with a variable diameter. Preferably, the second spiral reactor (20) comprises turns (4) having a radius which may vary between 0.2 m and 4.0 m, preferably between 0.4 m and 2.0 m, more preferentially between 0.5 m and 1.0 m.

Preferably, the second spiral reactor (20) comprises at least one reaction conduit (7A, 7B, 7C, 7D) having a passage section comprised between 20 $cm^2$ and 2,000 $cm^2$, preferably between 80 $cm^2$ and 1,300 $cm^2$, more preferentially between 180 $cm^2$ and 500 $cm^2$.

Preferably, the second spiral reactor (20) is of an elongated shape defining a substantially vertical longitudinal axis (10) (+/−10%).

Preferably, the second spiral reactor (20) for secondary crystallization—decantation surrounds the first reactor (19) for primary reaction-crystallization.

Preferably, the second reactor (20) for secondary crystallization—decantation is comprised inside the first reactor (19) for primary reaction-crystallization.

Preferably, the first reactor (19) is of a cylindrical, truncated cylindro-conical, conical, truncated conical, rectangular, square or spiral-shaped shape.

Preferably the wet and large precipitated solid inorganic final product (3C) is recovered by the apparatus for separating particles (5) after precipitation in said second reactor (20) for crystallization-decantation and in said first reactor (19), said device comprising:
- at least one apparatus (15) for providing the first fluid (1) giving the possibility of injecting said first fluid (1) through an injection conduit (15A) in said first reactor (19),
- at least one apparatus (16) for providing the second fluid (2) giving the possibility of injecting said second fluid (2) through an injection conduit (16A) in said first reactor (19),
- at least one apparatus (40B) for adjusting the pH connected to the first reactor (19) through a conduit (41),
- at least one connection valve (51) connecting the first reactor (19) and the second reactor (20), said valves (51) being dispersed along the totality of the height of said first reactor (19) and of said second spiral reactor (20), the height being measured relatively to the second reactor (2) of an elongated shape defining a substantially vertical longitudinal axis (10) (+/−10%),
- the small (3A) and intermediate (3B) solid inorganic product gradually becoming bigger while falling by gravity precipitation into said at least one conduit (7A, 7B, 7C, 7D) of the second reactor (20) as soon as the weight of said small (3A) and intermediate (3B) solid inorganic product gives the possibility of overcoming the rising flow of a mixture of the first fluid (1) and of the second fluid (2) and the small (3A) and intermediate (3B) solid inorganic product flowing down is transferred by gravity by sliding along the walls of said second reactor (20) and through at least one transfer conduit (22) towards the bottom of the first reactor (19) in order to end up with a large and wet precipitated solid inorganic final product (3C) being discharged towards the apparatus for particle separation and discharge of the secondary remnant (5),
- at least one conduit (18A) for injecting gas (18) into said first reactor (19).

The device according to the present invention comprises an element X selected from among Cd, Cr, Co, Cu, Eu, Ge, Fe, Pb, Mn, Ni, Pt, Sn, V, Zn, Ti, Si, Po, Hg, Yb, Sm, Md, No.

The device according to the present invention comprises an element $X^{2+}$ selected from among $Cd^{2+}$, $Cr^{2+}$, $Cu^{2+}$, $Eu^{2+}$, $Ge^{2+}$, $Fe^{2+}$, $Pb^{2+}$, $Mn^{2+}$, $Ni^{2+}$, $Pt^{2+}$, $Sn^{2+}$, $V^{2+}$, $Zn^{2+}$, $Ti^{2+}$, $Si^{2+}$, $Po^{2+}$, $Hg^{2+}$, $Yb^{2+}$, $Sm^{2+}$, $Md^{2+}$, $No^{2+}$.

The device according to the present invention comprises a first fluid (1) mixed with said second fluid (2) in the upper portion of said first reactor (19) in order to form a small (3A) and intermediate (3B) solid inorganic product gradually becoming bigger, before injection of said small (3A) and intermediate (3B) solid inorganic product into the second reactor (20), where the ascent rate of the first fluid (1) mixed with said second fluid (2) is comprised between 0.01 m/s and 3 m/s.

Figure 1:
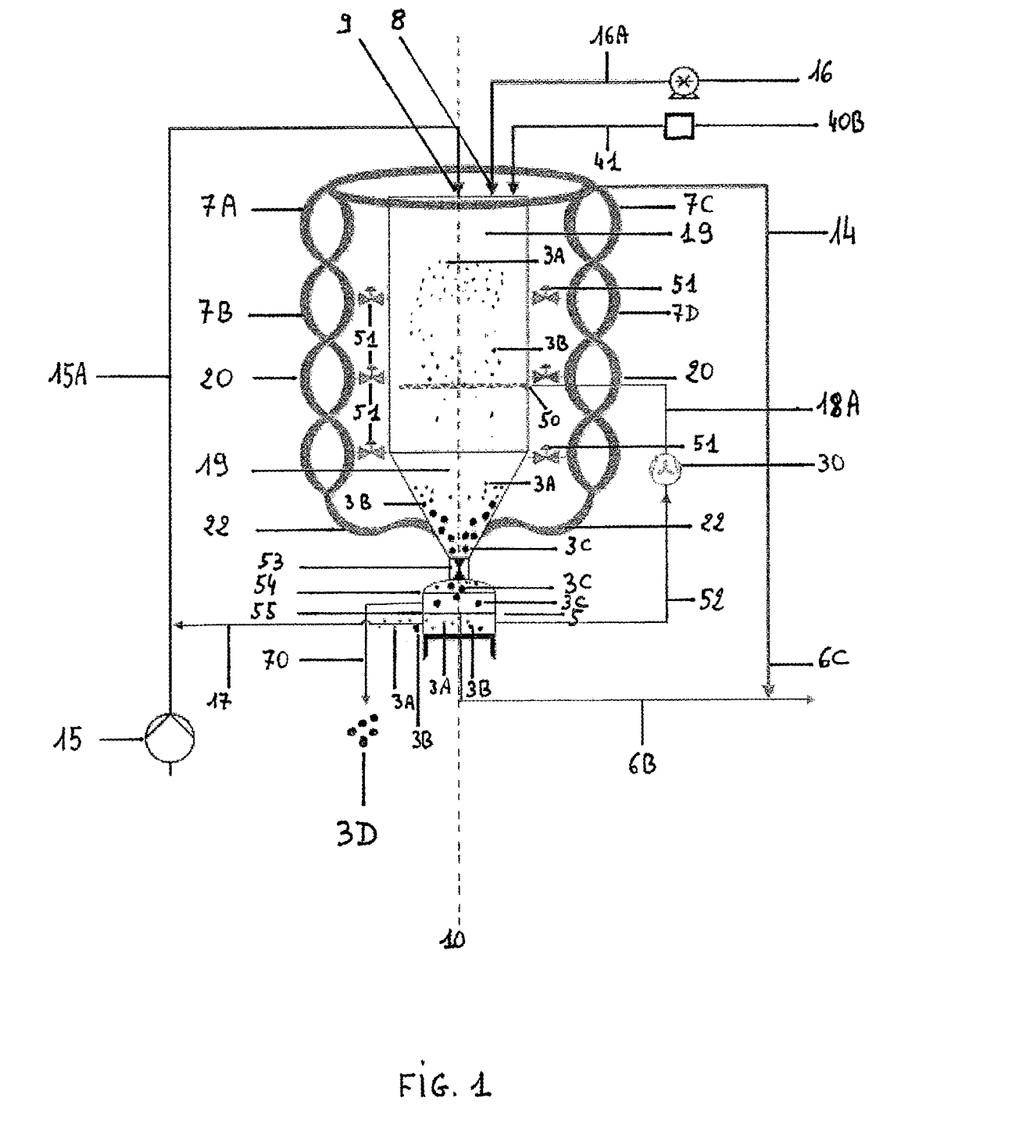
FIG. 1: block diagram of the device of the present invention showing a substantially vertical axis (10)
Figure 2:
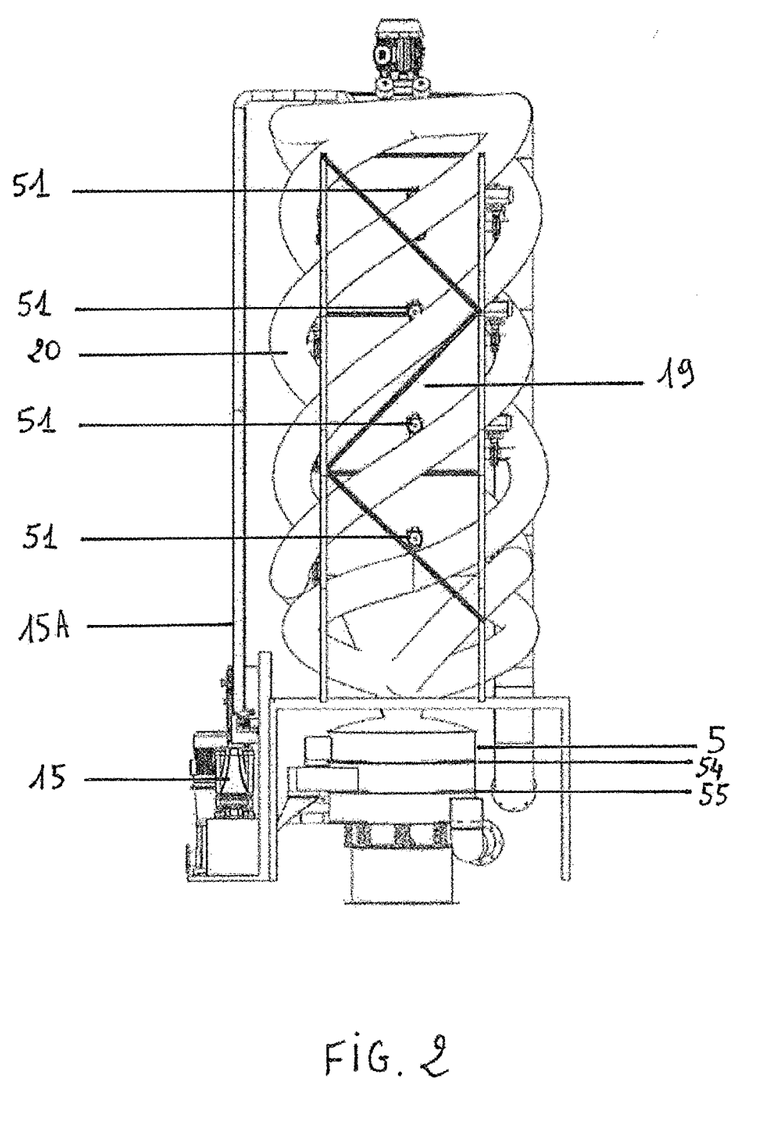
FIG. 2: left view of the device of the present invention
Figure 3:
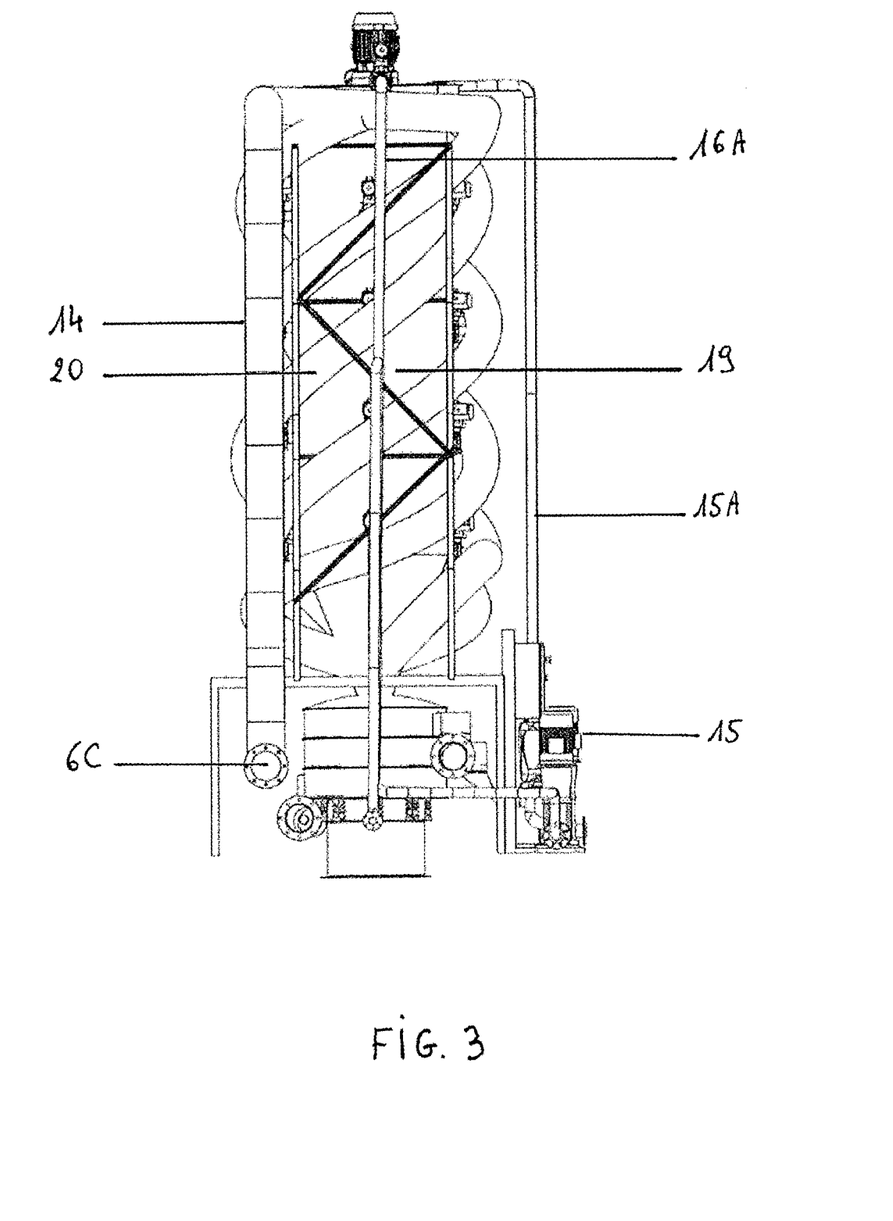
FIG. 3: right view of the device of the present invention
Figure 4:
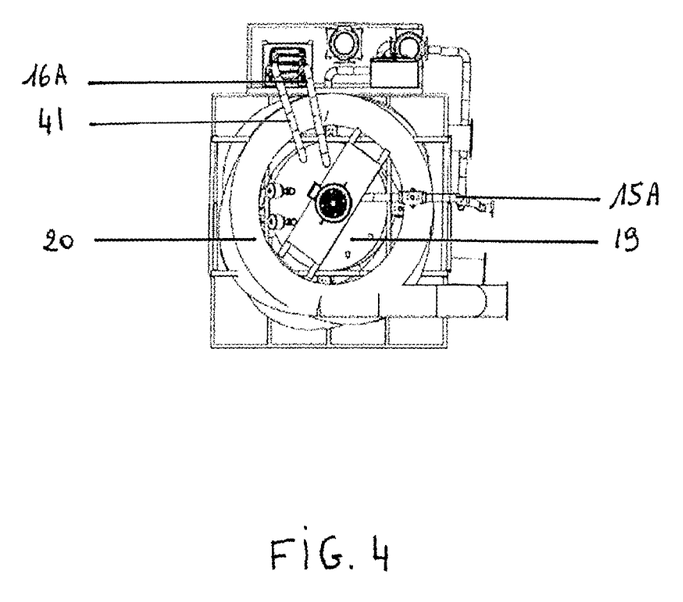
FIG. 4: top view of the device of the present invention
Figure 5:
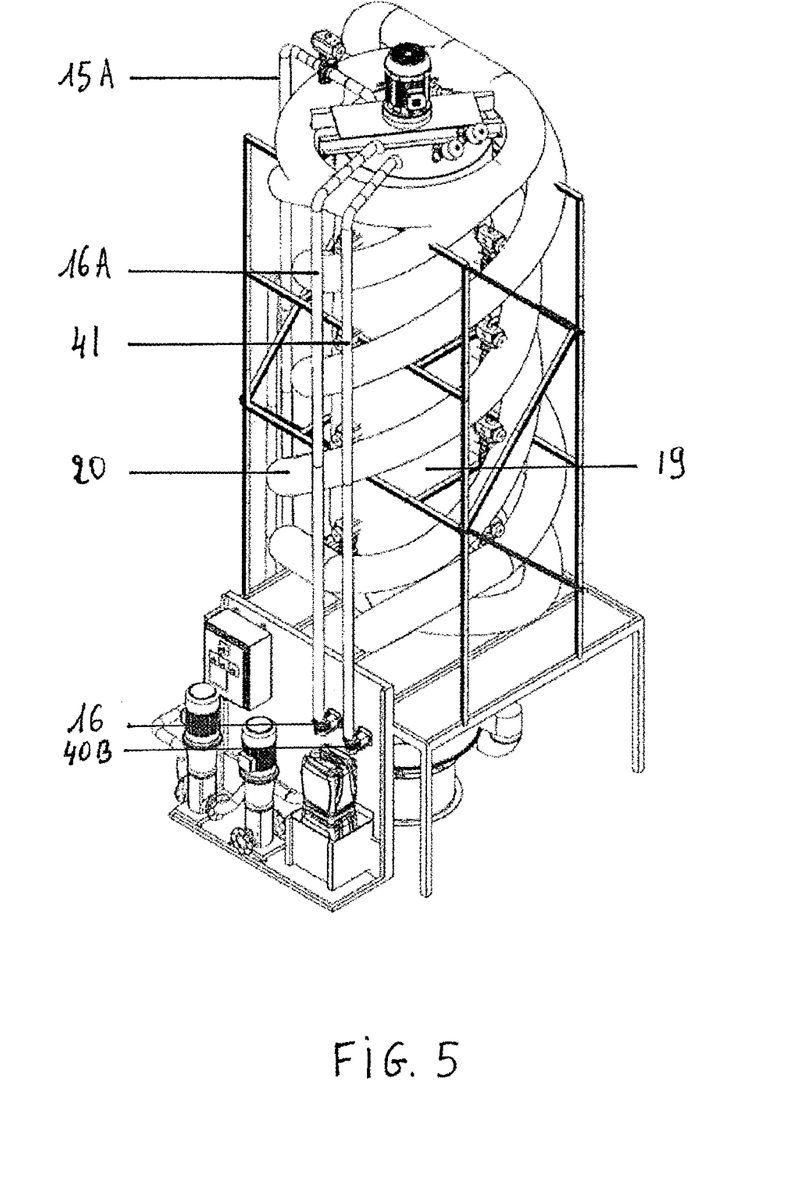
FIG. 5: perspective view of the device of the present invention
Figure 6:
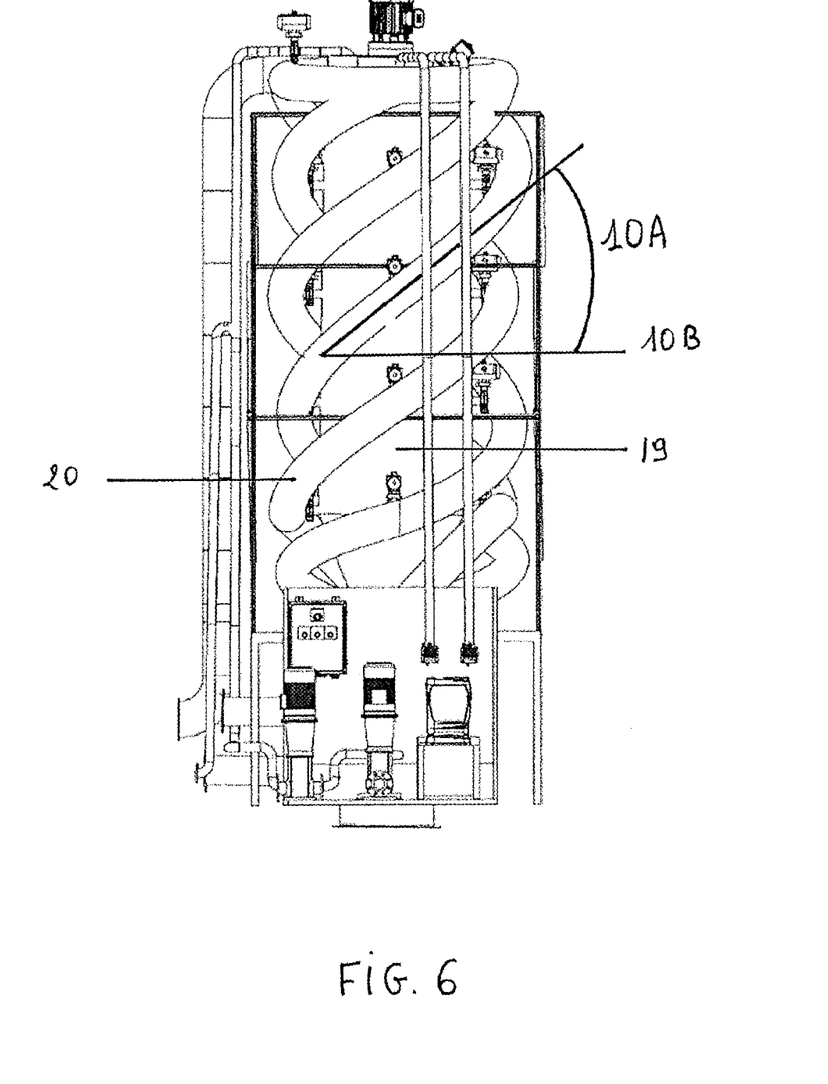
FIG. 6: front view of the device of the present invention showing a substantially horizontal axis (10B) and a tilt angle (10A) of a turn (4).
Figure 7:
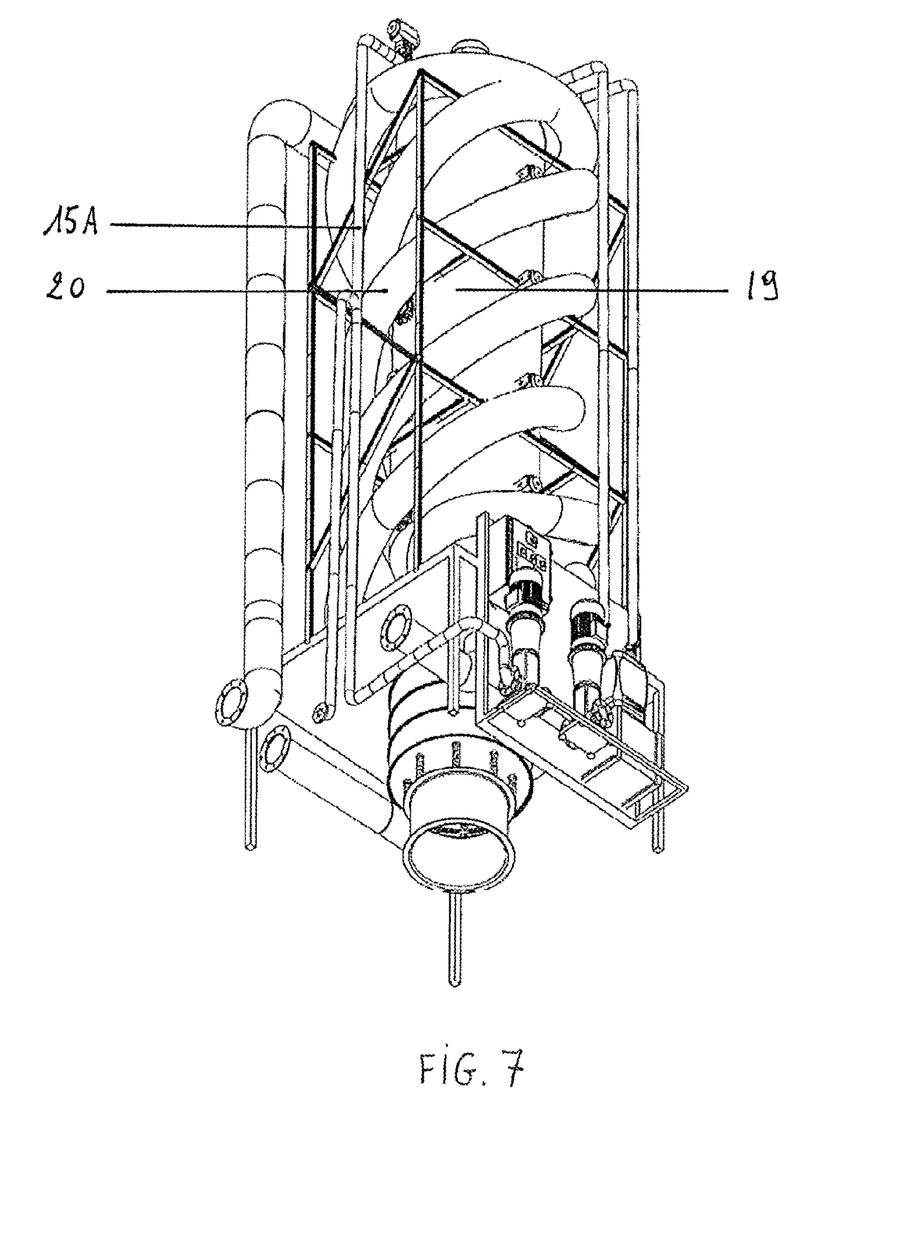
FIG. 7: perspective view of the bottom of the device of the present invention
Figure 8:
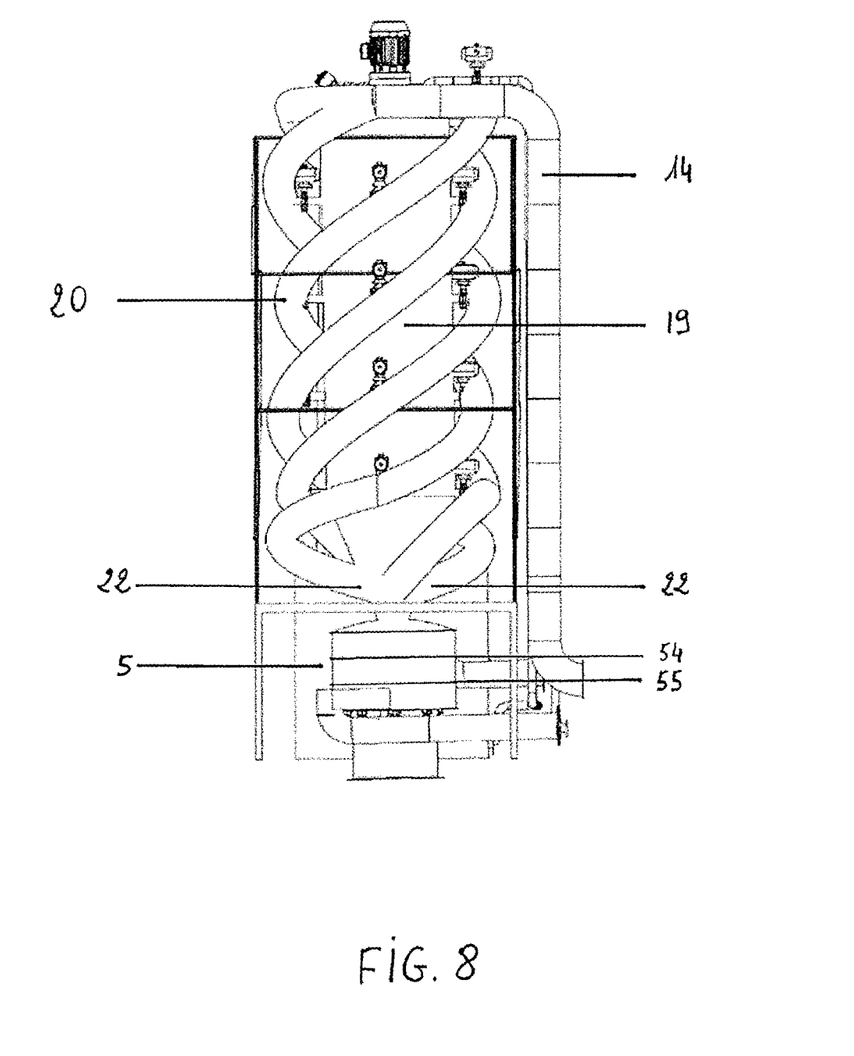
FIG. 8: rear view of the device of the present invention
Figure 9:
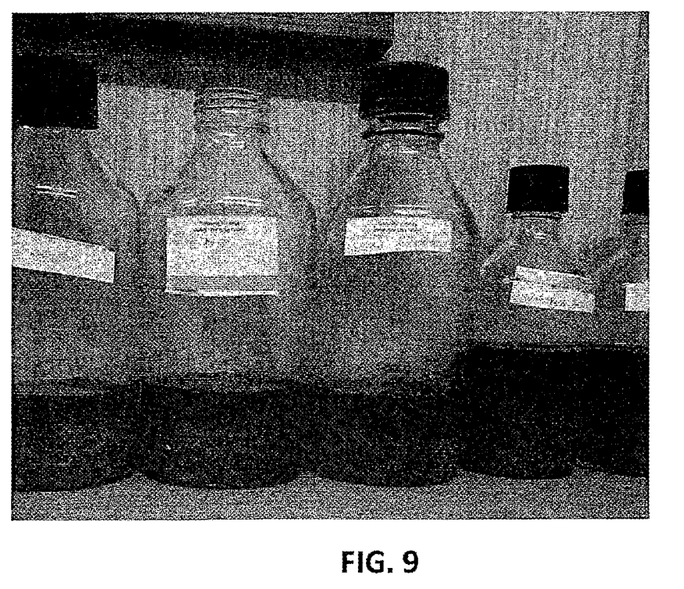
Figure 10:
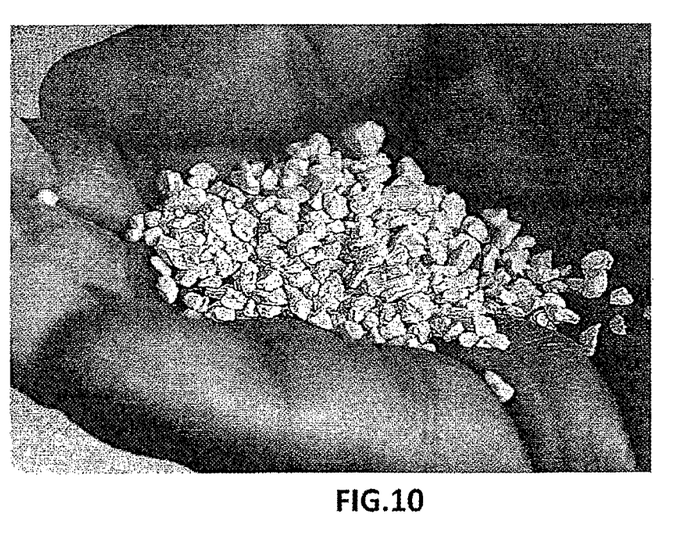
FIG. 10: shows dry $NH_4PO_4X$, i.e. crystals of the precipitated solid inorganic final product (3) consisting of phosphorus, nitrogen and an element X.

The device according to the present invention comprises at least one spiral reaction conduit (7A, 7B, 7C, 7D) of the second reactor (20) having a tilt angle (10A) of the turn preferably comprised between 10° and 70°, preferably between 20° and 60°, or preferably between 48° and 55°, the tilt angle (10A) being defined relatively to a horizontal axis (10B) substantially parallel to the ground (+/−10%).

The device according to the present invention comprising a second reactor (20) consisting of at least one spiral-shaped reaction conduit (7A, 7B, 7C, 7D) for which the number of turns (4) is comprised between 1 and 20, preferably between 4 and 10, more preferentially between 4 and 6 relatively to the height of the second reactor (20) of elongated shape defining a substantially vertical longitudinal axis (10) (+/−10%).

Preferably, the weight of a single crystal of the large and dry (3D) precipitated solid inorganic final product is comprised between 0.001 g and 1.5 g, 0.005 g and 1.3 g, 0.006 g and 1.2 g, preferably between 0.01 g and 1.0 g, 0.01 g and 0.09 g, 0.01 g and 0.05 g, more preferentially between 0.1 g and 0.9 g, 0.3 g and 0.7 g, 0.4 g and 0.6 g. Preferably said second spiral rector (20) is of an elongated shape defining a substantially vertical longitudinal axis (10) (+/−10%).

Preferably, the size of a crystal of said large and dry precipitated solid inorganic final product (3D) is comprised between 1 mm and 10 mm, preferably between 2 mm and 9 mm, more preferentially between 3 mm and 8 mm, still more preferentially between 4 mm and 7 mm, between 5 mm and 6 mm.

The present invention relates to a method for recovering a large and dry precipitated solid inorganic final product (3D) consisting of phosphorus, nitrogen and an element X selected from among the earth-alkaline metals Be, Mg, Ca, Sr, Ba, Ra, formed from a first fluid (1) phosphorus- and nitrogen-containing fluid mixed with a second fluid (2) consisting of at least one divalent cation $X^{2+}$ selected from among $Be^{2+}$, $Mg^{2+}$, $Ca^{2+}$, $Sr^{2+}$, $Ba^{2+}$, $Ra^{2+}$, said method operating at a temperature comprised between 20° C. and 90° C., and including the following steps:

A) injecting the first fluid (1) through at least an injection point (9) connected to at least one first reactor (19) for primary reaction-crystallization,
B) injecting a gas (18) into said first reactor (19) at at least one injection point (50),
C) adjusting the pH (40B) by injecting a basic solution,
D) injecting the second fluid (2) through at least one injection point (8) connected to said first reactor (19) for primary reaction-crystallization,
E) growing crystals of a small (3A) and intermediate (3B) solid inorganic product becoming gradually bigger in the said first reactor (19),
F) increasing the dwelling time of the crystals of the small (3A) and intermediate (3B) solid inorganic product by transferring a portion of the first fluid (1), of a portion of the second fluid (2) mixed with the basic solution and of a portion of the crystals of the small (3A) and intermediate (3B) solid inorganic product of the first reactor (19) towards a second spiraled reactor (20) for secondary crystallization-decantation,
G) migrating by gravity crystals of a wet and large precipitated solid inorganic final product (3C) of the second spiraled reactor (20) towards the first reactor (19) through a transfer conduit (22) connecting the second reactor (20) to the first reactor (19),
H) separating crystals of a wet precipitated solid inorganic final product (3C) and of the secondary remnant (6B) at at least one device (5) for separation of particles and discharge of the secondary remnant,
I) drying crystals of the wet and large precipitated solid inorganic final product (3C).

The method according to the present invention may comprise an additional step J) for initiating crystallization by injection into the first reactor (19) of a fraction of the small (3A) and intermediate (3B) solid inorganic product by means of at least one initiation channel (17) connecting said apparatus (5) for separating particles and discharging the secondary remnant (6B) towards said first reactor (19).

The method according to the present invention may comprise an additional step K) for suction of the gas upper volume of the apparatus (5) in which at least one conduit (52) for suction of the gas upper volume of the apparatus (5) connects the apparatus (5) to said apparatus (30) for injecting a gas (18) for promoting recovery of said small solid inorganic product (3A).

Preferably, in step D) the injection point (8) is located at a height greater than that of the valve (51) the highest in height (i.e. the valve the closest to the injection points (8) and (9)).

Preferably, the gas (18) of step B) is selected from among air, biogas, gas poor in $CO_2$.

Preferably, the pH of step C) attains a pH comprised between 8 and 11, preferably between 9 and 10.

Preferably, said element X is selected from among Cd, Cr, Co, Cu, Eu, Ge, Fe, Pb, Mn, Ni, Pt, Sn, V, Zn, Ti, Si, Po, Hg, Yb, Sm, Md, No.

Preferably $X^{2+}$ is selected from among $Cd^{2+}$, $Cr^{2+}$, $Co^{2+}$, $Cu^{2+}$, $Eu^{2+}$, $Ge^{2+}$, $Fe^{2+}$, $Pb^{2+}$, $Mn^{2+}$, $Ni^{2+}$, $Pt^{2+}$, $Sn^{2+}$, $V^{2+}$, $Zn^{2+}$, $Ti^{2+}$, $Si^{2+}$, $Po^{2+}$, $Hg^{2+}$, $Yb^{2+}$, $Sm^{2+}$, $Md^{2+}$, $No^{2+}$.

The present invention relates to a large and dry precipitated solid inorganic final product (3D) which may be obtained by the method of the present invention. In the present invention, the large and dry precipitated solid inorganic final product (3D) may be used as a fertilizer.

The extracted crystals (3C) may be sifted with a sieve for which the size of the meshes may vary. The crystals of the wet final product (3C) will then be dried in a specific oven, by injecting hot air from the methanization unit. The passing particles may be reintroduced at the head of the decanter, in the top tank of the reactor (19) in order to sow the solution.

EXAMPLE OF APPLICATIONS

Simple Implementation:
Particularly adapted within the scope of an association with a water extraction unit from the digestion digestates, the first entering fluid (1) is nothing other than the retentate portion of a membrane filtration of the micro-ultra- or nano-filtration type. Before this filtration, the fluid is clarified by sifting with a mesh from 50 to 1,000 µm, ideally 200 to 300 µm. At the outlet of the module subject of the present invention, the fluid returns into the digester.

Alternative Example 1

Implementation in Series: Alternative 1:
Particularly adapted within the scope of filtration by reverse osmosis, the setting into place of a module subject of the present invention or of several modules in series on the recirculation loop of reverse osmosis gives the possibility of reducing the $NH_4^+$ concentration of the first fluid (1) to be filtered. Thus, the $NH_4^+$ forming a molecule which is difficult to retain for the OI BP-MP, the quality of the filtrate being improved and the blocking of the membranes thereby limited.

Exemplary Alternative 2

Operating on a Non-Clarified or Further Clarified Fluid, a Mineral Organic Hybrid Fertilizer The MAP (Magnesium, Ammonium, Phosphate) composition may be added with value by addition of organic material on the one hand, completing the fertilizing action of the extracted mineral. If the second fluid (2) entering the device subject of the present invention is more or less clarified and/or stemming from a retentate of a more or less reducing filtration, the organic material will then form the central core of the mineral particles which will agglomerate around said core. The extracted MAP will then be an organic/mineral hybrid fertilizer.

Detailed Summary of the Invention

Step 1:
The phosphorus- and nitrogen-containing fluid (1) joins up with the channel (15A) the first reactor (19) via the injection point (9). This first fluid is stirred with a hydraulic transfer pump (15) or by the intrinsic pressure related to the global closed circuit.

Step 2:
A second fluid (2) containing a cation $X^{2+}$ is injected into the first reactor (19) via the injection point (8) by means of a hydraulic transfer or dosage pump (16).

Step 3:
At the same time, when the reactor is filled, a gas (18) pour in $CO_2$, air, is injected through the channel (18A) by means of an apparatus (30).

Step 4:
Following this stripping with air, an adjustment of the pH is possible by means of the apparatus (40B) which injects a basic solution (for example NaOH) via the conduit (41) allowing increase of the pH.

Step 5:
Once the reaction conditions are satisfied (pH and optimum mixing between fluid 1 and fluid 2), the chemical reaction may then occur in the reactor (19), potentially accelerated by means of a conventional stirring method.

Step 6:
Crystals of the small (3A) and intermediate (3B) solid inorganic product gradually becoming bigger fall under the effect of gravity to the bottom of the reactor (19) in the frustoconical portion.

Step 7:
Crystals of small (3A) and intermediate (3B) solid inorganic products and large and wet products (3C) are released at regular intervals by one or several valves (53) located at the bottom of the frustoconical portion of the first reactor (19) and directed towards a separator (5) comprising a first sieve (54) with large meshes in its upper portion and a second sieve (55) with small meshes in its lower portion. The most coarse particles (3C) crossing only the first sieve are discharged by the separator (5) via the discharge conduit (70) and forms the large dry precipitated solid inorganic product (3D) after drying. The small (3A) and intermediate (3B) solid inorganic products crossing the first sieve and the second sieve are re-injected via the initiation channel (17) into the channel for providing the first fluid (15A) in order to sow the initial solution in the first reactor (19). The fluid crossing the separator (5) is free of particles and is depleted in phosphorus. It forms the secondary remnant (6B).

Step 8:
The fluid remaining in the reactor (19) is brought via one of the separator valves (51) of the first reactor (19) towards the spiral reaction conduit (7A, 7B, 7C, 7D) of the second reactor (20). The precipitation reaction may then continue gradually as the fluid moves in the turns. The small (3A) and intermediate (3B) solid inorganic products which continue to become bigger and to precipitate in the turns (4), falling under the action of gravity into the lower portion of the spiral reactor (20) once a wet large solid inorganic product (3C) is formed and joins up with the particles stored (3C) in the frustoconical portion of the first reactor (9) via the channel (22).

Step 9:
The remainder of the fluid contained in the turns and presently depleted in phosphorus joins up with ascent the discharge conduit (14) of the main remnant (6C).

COMPARATIVE EXAMPLES

| Nature of the unit | Conventional column reactor | Reactor from WO 2012/134255 | Reactors (19) and (20) according to the present invention |
| --- | --- | --- | --- |
| Dimensions of the unit | 8 meters high × diameter of 3 meters, requires special premises and civil engineering | — | Reduced: transportable and "Plug & Play" System Height: 2 m to 3 m |
| Capacity per hour | Minimum 80 m³/h (500 kg/d) | — | May be modulated (from 1 m³/h) |
| Separation method | Decantation + vibrating sieve or centrifugation | centrifugal decanter rotary drum sieve | Decantation + vibrating sieve |
| Sowing | With fine struvite particles or sand grains, calcium silicate | By small size grains turned upside down in the rotary drum | With fine struvite particles, calcium silicate |
| Decantation rate | According to the nature of the substrate | — | 2 to 3 times greater as compared with a conventional column reactor |

| Nature of the unit | Conventional column reactor | Reactor from WO 2012/134255 | Reactors (19) and (20) according to the present invention |
|---|---|---|---|
| Dwelling time | 10 to 15 days | 4 to 6 mins in the reactor + for an unknown period in the drum | 15 to 20 days |
| Dimensions of the crystals | About 1 mm | 1 mm to 1.5 mm | 1 mm to 10 mm |
| Mixing method | Vertical hydraulic flow | Air injection | Hydraulic flow by a vortex + air from the sifting |

Certain characteristics of the invention which are described as a separate embodiment, may also be provided in combination with a single embodiment. Conversely, certain characteristics of the invention which are described in an embodiment combined in a single embodiment, may also be provided separately in several separate embodiments. Although the invention has been described in connection with specific embodiments thereof, it is obvious that several alternatives, modifications and variations may be detected by one skilled in the art. Thus, we intend to encompass such alternatives, modifications and variations which fall within the scope of the claims hereafter.

The invention claimed is:

1. A device for recovering a large and dry precipitated solid inorganic final product (3D) consisting of phosphorus, nitrogen and of an element X selected from among alkaline-earth metals Be, Mg, Ca, Sr, Ba, Ra, formed from a first phosphorus- and nitrogen-containing fluid (1) mixed with a second fluid (2) consisting of at least one divalent cation $X^{2+}$ selected from among $Be^{2+}$, $Mg^{2+}$, $Ca^{2+}$, $Sr^{2+}$, $Ba^{2+}$, $Ra^{2+}$, said device comprising:
  at least one first reactor (19) for primary reaction-crystallization,
  at least one apparatus (5) for separating particles and discharging the secondary remnant (6B),
  at least one apparatus for adjusting the pH (40B),
  at least one apparatus (30) for injecting a gas (18),
  at least one apparatus (15) for providing the first fluid (1), and
  at least one apparatus (16) for providing the second fluid (2),
  wherein said device comprises at least one second reactor (20) for secondary crystallization decantation having a spiraled geometrical shape, said second reactor (20) being directly connected to said first reactor (19) through at least one valve (51) allowing the reaction bed of the first reactor (19), containing a small (3A) and intermediate (3B) solid inorganic product becoming gradually bigger, to be transferred into the reactor (20) for performing therein secondary crystallization before precipitating in order to obtain a wet and large precipitated solid inorganic final product (3C).

2. The device according to claim 1, wherein at least one initiation channel (17) containing said small (3A) and intermediate (3B) solid inorganic product, connects said apparatus (5) for separating particles and discharging the secondary remnant (6B) to at least an injection conduit (15A) for the first fluid (1) in the first reactor (19) for initiating the growth of said small (3A) and intermediate (3B) solid inorganic product in the first reactor (19) and in the second reactor (20) in order to obtain a wet and large precipitated solid inorganic final product (3C).

3. The device according to claim 1, wherein at least one conduit (52) for suction of the gas upper volume of the apparatus (5) connects the apparatus (5) to said apparatus (30) for injecting a gas (18) for promoting the recovery of said small (3A) solid inorganic product.

4. The device according to claim 1, wherein said second reactor (20) includes at least one reaction conduit (7A, 7B, 7C, 7D) forming a plurality of turns (4) of variable diameter.

5. The device according to claim 4, wherein the plurality of turns (4) have a radius which may vary between 0.2 m and 4.0 m.

6. The device according to claim 4, wherein said at least one reaction conduit (7A, 7B, 7C, 7D) of the second reactor (20) has a passage section comprised between 20 cm$^2$ and 2,000 cm$^2$.

7. The device according to claim 1, wherein said second reactor (20) is of an elongated shape defining a substantially vertical longitudinal axis (10).

8. The device according to claim 1, wherein the second spiral reactor (20) for secondary crystallization-decantation surrounds the first reactor (19) for primary reaction-crystallization.

9. The device according to claim 1, wherein the second reactor (20) for secondary crystallization-decantation is integrated to the inside of the first reactor (19) for primary reaction-crystallization.

10. The device according to claim 1, wherein the first reactor (19) is of a cylindrical, cylindro-frustoconical, conical, truncated conical, rectangular, square, or spiral shape.

11. The device according to claim 1, wherein said wet and large precipitated solid inorganic final product (3C) is recovered by the apparatus for separating particles (5) after precipitation in said second crystallization-decantation reactor (20) and in said first reactor (19), said device comprising:
  at least one apparatus (15) for providing the first fluid (1) giving the possibility of injecting said first fluid (1) through an injection conduit (15A) in said first reactor (19),
  at least one apparatus (16) for providing the second fluid (2) giving the possibility of injecting said second fluid (2) through an injection conduit (16A) in said first reactor (19),
  at least one apparatus (40B) for adjusting the pH connected to said first reactor (19) through a conduit (41),
  the at least one valve (51) connecting the first reactor (19) and the second reactor (20), the at least one valve (51) being dispersed along the totality of the height of said first reactor (19) and of said second reactor (20), the height being measured relatively to the second reactor (20) of elongated shape defining a substantially vertical longitudinal axis (10),
  the small (3A) and intermediate (3B) solid inorganic product gradually becoming bigger, falling by gravity precipitation in said at least one conduit (7A, 7B, 7C, 7D) of the second reactor (20) as soon as the weight of said small (3A) and intermediate (3B) solid inorganic product gives the possibility of overcoming the rising flow of the mixture of the first fluid (1) and of the second fluid (2) and the downflowing small (3A) and intermediate (3B) solid inorganic product is conveyed by gravity by sliding along the walls of said second reactor (20) and through at least one transfer conduit (22) towards the bottom of the first reactor (19) in order to end up with a wet and large precipitated solid inorganic final product (3C) being discharged towards the apparatus for separating particles and discharging the secondary remnant (5), at least one conduit (18A) for injecting gas (18) into said first reactor (19).

12. The device according to claim 1, wherein said first fluid (1) is mixed with said second fluid (2) in the upper portion of said first reactor (19) in order to form a small (3A) and intermediate (3B) solid inorganic product gradually becoming bigger, before injecting said small (3A) and intermediate (3B) solid inorganic product into the second reactor (20), where the ascent rate of the first fluid (1) mixed with said second fluid (2) is comprised between 0.01 m/s and 3 m/s.

13. The device according to claim 1, wherein said at least one spiral reaction conduit (7A, 7B, 7C, 7D) of the second reactor (20) has a tilt angle (10A) of the turns preferably comprised between 10° and 70°, the tilt angle (10A) being defined relatively to a horizontal axis (10B) substantially parallel to the ground.

14. The device according to claim 1, wherein the second reactor (20) comprises at least one spiral-shaped reaction conduit (7A, 7B, 7C, 7D) for which the number of turns (4) is comprised between 1 and 20 relatively to the height of the second reactor (20) of elongated shape defining a substantially vertical longitudinal axis (10).

* * * * *